United States Patent
Ayyagari

(10) Patent No.: US 7,995,489 B2
(45) Date of Patent: Aug. 9, 2011

(54) TOPOLOGY AND QUALITY OF SERVICE MANAGEMENT APPARATUS AND METHODS FOR COMMUNICATION NETWORKS

(75) Inventor: Arun Ayyagari, Seattle, WA (US)

(73) Assignee: The Boeing Company, Chicago, IL (US)

(*) Notice: Subject to any disclaimer, the term of this patent is extended or adjusted under 35 U.S.C. 154(b) by 952 days.

(21) Appl. No.: 10/868,565

(22) Filed: Jun. 14, 2004

(65) Prior Publication Data

US 2005/0276231 A1    Dec. 15, 2005

(51) Int. Cl.
H04L 12/28    (2006.01)
G06F 15/177    (2006.01)
(52) U.S. Cl. .................... 370/252; 370/254; 709/220
(58) Field of Classification Search ............... None
See application file for complete search history.

(56) References Cited

U.S. PATENT DOCUMENTS

| | | | | |
|---|---|---|---|---|
| 6,011,774 A * | 1/2000 | Cha | .............. | 370/225 |
| 6,456,599 B1 * | 9/2002 | Elliott | .............. | 370/254 |
| 6,643,466 B1 * | 11/2003 | Helms et al. | .............. | 398/120 |
| 6,842,439 B2 * | 1/2005 | Zeitfuss | .............. | 370/328 |
| 6,954,435 B2 * | 10/2005 | Billhartz et al. | .............. | 370/252 |
| 6,980,537 B1 * | 12/2005 | Liu | .............. | 370/338 |
| 6,990,350 B2 * | 1/2006 | Davis et al. | .............. | 455/452.2 |
| 7,068,600 B2 * | 6/2006 | Cain | .............. | 370/230.1 |
| 7,184,421 B1 * | 2/2007 | Liu et al. | .............. | 370/338 |
| 7,248,570 B2 * | 7/2007 | Bahl et al. | .............. | 370/329 |
| 7,269,198 B1 * | 9/2007 | Elliott et al. | .............. | 375/130 |
| 7,355,986 B2 * | 4/2008 | Vanderveen et al. | .............. | 370/255 |
| 2003/0037167 A1 | 2/2003 | Garcia-Luna-Aceves et al. | | |
| 2003/0161268 A1 | 8/2003 | Larsson et al. | | |
| 2003/0169721 A1 | 9/2003 | Tillotson | | |
| 2004/0032847 A1 | 2/2004 | Cain | | |
| 2004/0203435 A1 * | 10/2004 | Karlquist et al. | .............. | 455/67.11 |

FOREIGN PATENT DOCUMENTS

| | | |
|---|---|---|
| JP | 07-117876 | 12/1995 |
| JP | 08-185257 | 7/1996 |
| JP | 11-224568 | 8/1999 |

OTHER PUBLICATIONS

AD HOC Mobility Protocol Suite for the Mosaic ATD, Telcordia Technologies, Inc., Kenneth C. Young, Jr., et al, 5 pages.
An Integrated IP QOS Architecture—Performance, Telcordia Technologies, Inc., Byungsuk Kim, et al, 2002, 5 pages.

(Continued)

Primary Examiner — Pankaj Kumar
Assistant Examiner — Marcus R Smith
(74) Attorney, Agent, or Firm — Harness, Dickey & Pierce, P.L.C.

(57) ABSTRACT

A method of structuring an ad hoc network is described. A node discovers and pairs with another node to form a network link. Each node maintains a network topology based on node/link states received from other nodes. One node communicates an outbound link state to other nodes which schedule transmission based on the communicated state. A node includes a network control module that controls network routing, a node control module that controls packet routing within the node, and a switching platform control module that provides an outbound link state to the other control modules of the node.

27 Claims, 3 Drawing Sheets

OTHER PUBLICATIONS

High-Availability Free Space Optical and RF Hybrid Wireless Networks, IEEE Wireless Communications, Hossein Izadpanah, et al, Apr. 2003, pp. 45-53.

International Search Report (Aug. 25, 2005), International Application No. PCT/US2005/020175.

Written Opinion of the International Searching Authority (Aug. 25, 2005), International Application No. PCT/US2005/020175.

European Examination Report in reference to Application No. 05759487.1-2416 dated Sep. 26, 2008.

* cited by examiner

TOPOLOGY AND QUALITY OF SERVICE MANAGEMENT APPARATUS AND METHODS FOR COMMUNICATION NETWORKS

FIELD OF THE INVENTION

The present invention relates to communication networks and, more particularly, to Quality of Service (QoS) management in communication networks.

BACKGROUND OF THE INVENTION

Ubiquitous use of the World Wide Web (WWW) and a wide range of Internet services has caused Internet traffic to grow exponentially. Traffic from real-time/mission-critical applications co-exists with non-real-time applications over an Internet infrastructure that provides best-effort service to both kinds of traffic. When Internet traffic is high, performance of bandwidth/delay-sensitive applications can deteriorate.

Quality of Service (QoS) refers to performance experienced by end-users and applications. QoS is measured in various ways and generally is dependent on the service requirements of end-users and applications. Such requirements may pertain, for example, to time taken to service a query with a response, ability to effectively perform distributed cooperative control, acceptable audio quality for voice calls using IP telephony, and satisfactory video quality for real-time video presentations.

There also has been tremendous growth in mobile ad hoc wireless networks, including but not limited to satellite communication networks in commercial and military communication environments. These wireless mobile communication networks are subject to rapidly changing network topology and link bandwidth that can affect QoS performance for end-users and applications.

SUMMARY OF THE INVENTION

The present invention, in one implementation, is directed to a method of managing a network having a plurality of nodes. A first node communicates a state of an outbound link to at least one receiving node, and the receiving node schedules a transmission to at least one of the first node and a second node based on the communicated state.

In another implementation, the invention is directed to a method of structuring an ad hoc network. Each of a plurality of nodes receives a node/link state of each other node. Based on at least one received node/link state, a first node pairs with a second node to form at least one network link. Each node maintains a network topology based on the pairing and the received node/link states.

In another configuration, the invention is directed to a network having a plurality of nodes. Each node includes a network control module configured to determine packet routing across the network. A node control module controls packet routing within the node. A switching platform control module controls switching of packets to and from the node. The switching platform control module provides state information via the node and network control modules to each of the other nodes, the state information pertaining to an outbound link of the node.

In yet another configuration, the invention is directed to a machine-readable medium for use with a processor having a memory. The machine-readable medium includes instructions to cause a processor to configure a network control module of a first node of a network to determine packet routing across the network. Instructions also are included which cause a processor to configure a node control module of the first node to control packet routing within the first node. The medium also includes instructions to cause a processor to configure a switching platform control module of the first node to control switching of packets to and from the first node, and to provide state information via the node control module and the network control module to a second node of the network. The state information pertains to an outbound link of the first node.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred systems and methods is merely exemplary in nature and is in no way intended to limit the invention, its application, or uses. Although various configurations of the present invention are shown in the Figures as having wired links among nodes and other network components, the invention is not so limited. It should be understood that various network links can be wireless and may include, but are not limited to, free space optic (FSO) and/or radio frequency connections. In various aspects, the disclosure is directed to a non-transitory machine-readable medium for use with a processor having a memory. Non-transitory media are those that are not transitory media such as signals per se.

Figure 1:
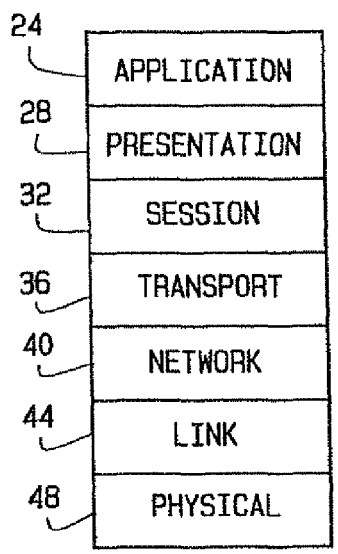
FIG. 1 is a block diagram of a known network protocol stack architecture.

Various implementations of the present invention may be described with reference to a known network protocol stack architecture, indicated generally in FIG. 1 by reference number 20. Network data transmission may originate in an application layer 24, for example, from distributed applications and email. A presentation layer 28 relates, for example, to encrypting, decrypting and translating between network terminal protocols. A session layer 32 may relate to establishing, maintaining and ending a network connection. A transport layer 36 may be concerned, for example, with packet formation and handling. A network layer 40 may relate to addressing of packets to an appropriate destination. A link layer 44 may be concerned, for example, with preparation for transmitting packets over a physical layer 48. It should be understood that the foregoing stack architecture is illustrative only, and that implementations of the present invention could also be described with reference to other stack architectures and/or layers. It also should be noted that terminology used in describing the stack 20 is illustrative and should not be construed as limiting any implementation of the present invention.

Figure 2:
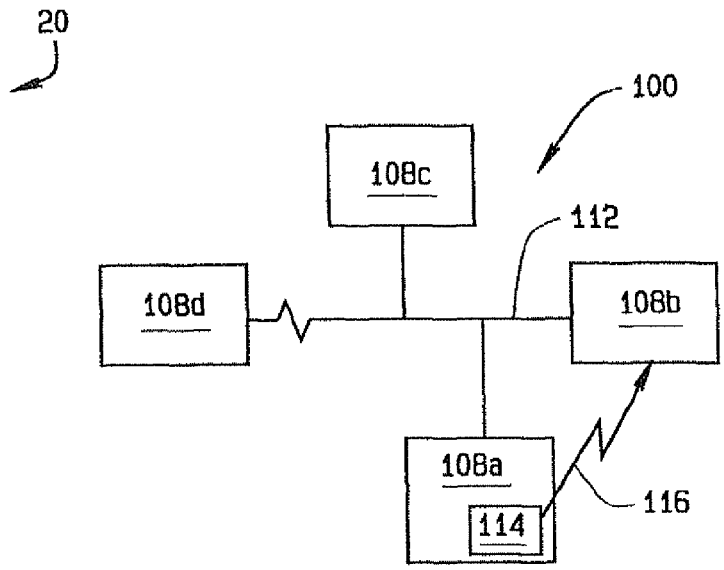
FIG. 2 is a block diagram of a network in accordance with one configuration of the present disclosure.

One implementation of a network according to principles of the present invention is indicated generally by reference number 100 in FIG. 2. In the present example, the network 100 is an ad hoc network in which a plurality of nodes 108, for example, nodes 108a through 108d, may be in communication with one another. The nodes 108 may include, for example, one or more routers. It should be understood, however, that the term "router" is used merely to describe one aspect of the nodes 108, i.e., their capability to route information as described below. The nodes 108 may include additional functionality, for example, application functionality that may be local to the node. A node 108 may become linked to another node 108 in the network 100 as further described below.

The network 100 includes an "order wire" channel 112 that allows for out-of-band communication between nodes 108, for example, within a given region covered by the network. The terms "out-of-band" and "in-band" are used herein with reference to one or more frequency bands in which communication over the network 100 is normally established. The order wire channel 112 may or may not belong to a particular network system and does not need to have a high bandwidth capacity. The order wire channel 112 preferably has low probability of detection (LPD), low probability of jamming (LPJ), and low probability of intercept (LPI) characteristics. The order wire channel 112 in some configurations can provide omni-directional communication over ranges long enough to cover the given region in which the nodes 108 may be located. In other configurations, although the order wire channel 112 provides each node 108 with a means for communication with each of the other nodes, such communication means may not necessarily be omni-directional.

Figure 5:
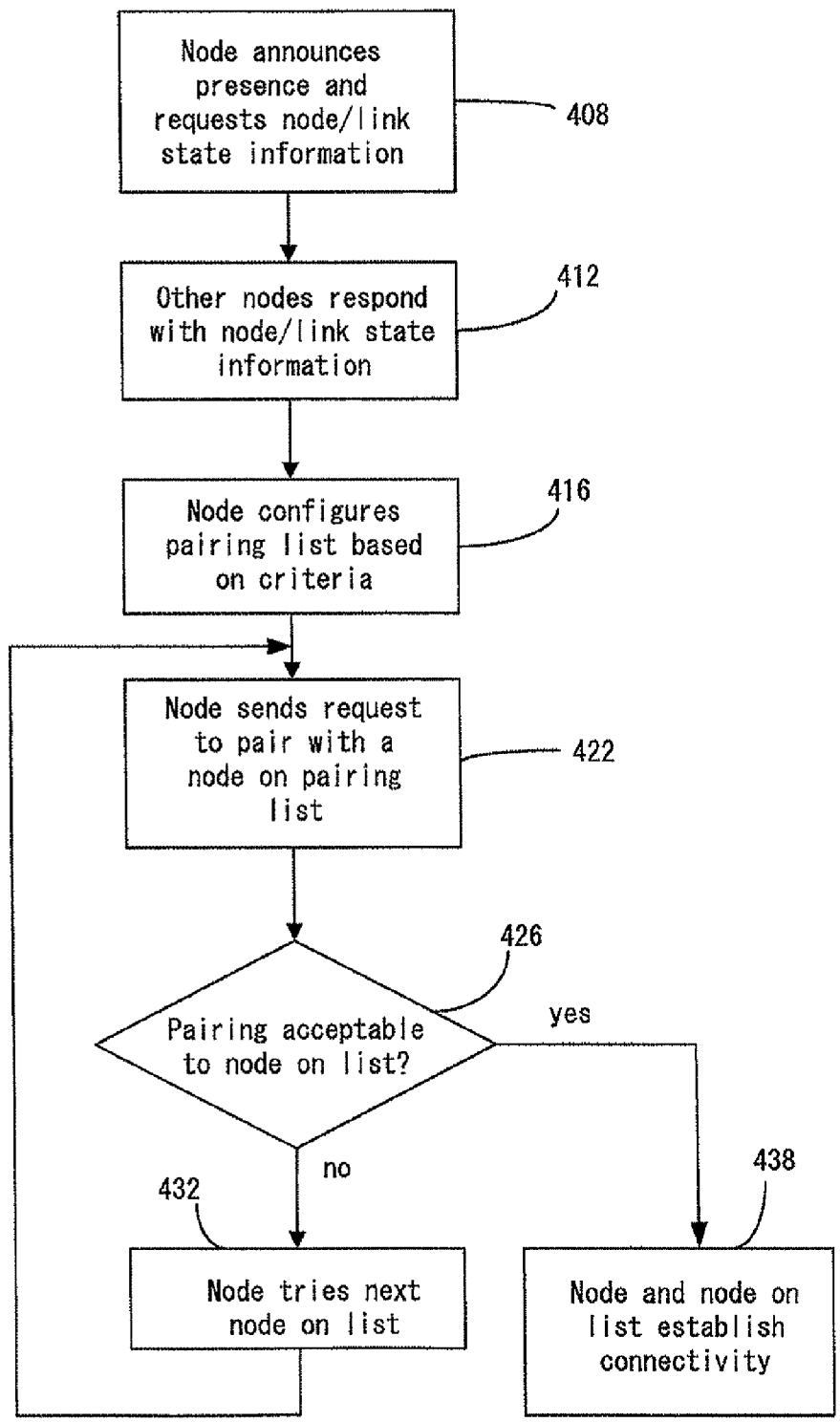
FIG. 5 is a flow diagram of node interaction in accordance with one configuration of the disclosure.

A node 108 may join the network 100, or alternatively may create an ad hoc network such as the network 100, in the following exemplary manner, e.g., with reference to FIG. 5. A node, e.g., the node 108a, at process block 408 announces its presence over the order wire channel 112 and requests other nodes 108 to send their node/link state information to the node 108a via the order wire channel 112. Node/link state information may include, for example, node location and trajectory, number of links, current pairing state, bit error rate, and link bandwidth and utilization. When the node 108a receives such information from responding node(s), e.q., at process block 412, it thereby discovers the responding nodes including, for example, nodes 108b, 108c and 108d. Node 108a, e.g., at process block 416, configures a pairing list of nodes 108 based on one or more criteria. Such criteria may include a neighbor node's node/link state, atmospheric conditions, location and trajectory of neighbor node(s) 108 relative to a location and trajectory of the node 108a, and current topology of the network 100.

The node 108a, e.g., at process block 422, communicates a request to pair with an appropriate neighbor node 108 from the pairing list, e.g., the node 108b. If, e.g., at process block 426, the requested pairing is acceptable to the node 108b, connectivity may be established between the two nodes, e.g., at process block 438. Connectivity may be established, for example, in a manner associated with the presentation layer 28, session layer 32 and transport layer 36 of the network protocol stack 20, e.g., using transmission control protocol (TCP).

If the request to pair is not acceptable to the node 108b, the node 108a, e.g., at process block 432, sends a request to pair with another node 108 (for example, the node 108c) on the pairing list, and so on, until the node 108a succeeds in pairing with a node 108 or the pairing list of feasible neighbor nodes is exhausted. The foregoing pairing process may be repeated to establish additional links between the node 108a and other node(s) 108. Following successful pairing with neighbor node(s) 108, the node 108a can communicate its node/link state to other nodes 108 within the network 100 via in-band communication, for example, by multicasting.

In one configuration, in-band communication may take place in the following manner. When connectivity is established between nodes 108a and 108b as previously described, data packets (not shown) can be sent from the node 108a via a transmit scheduler 114 and outgoing link 116 to the node 108b. In-band communication is in addition to communication provided by the out-of-band order wire channel 112. It should be noted that communication with node(s) not belonging to the network 100 but within the range of the order wire channel 112 can be maintained via the order wire channel 112.

It should be noted that the foregoing discovery and pairing process may be performed reiteratively and continuously, e.g., as a background process during network operation. In the present configuration, the current node/link state(s) of all of the node(s) 108 of the network 100 may be constantly maintained in each node 108. In such manner, current topology information and node/link state information can be available to each node such that each node 108 may perform topology management as described herein. Each node 108 may perform topology management relative to the network 100 independently of the other nodes, and thus the network 100 may be managed in a distributed manner.

Figure 3:
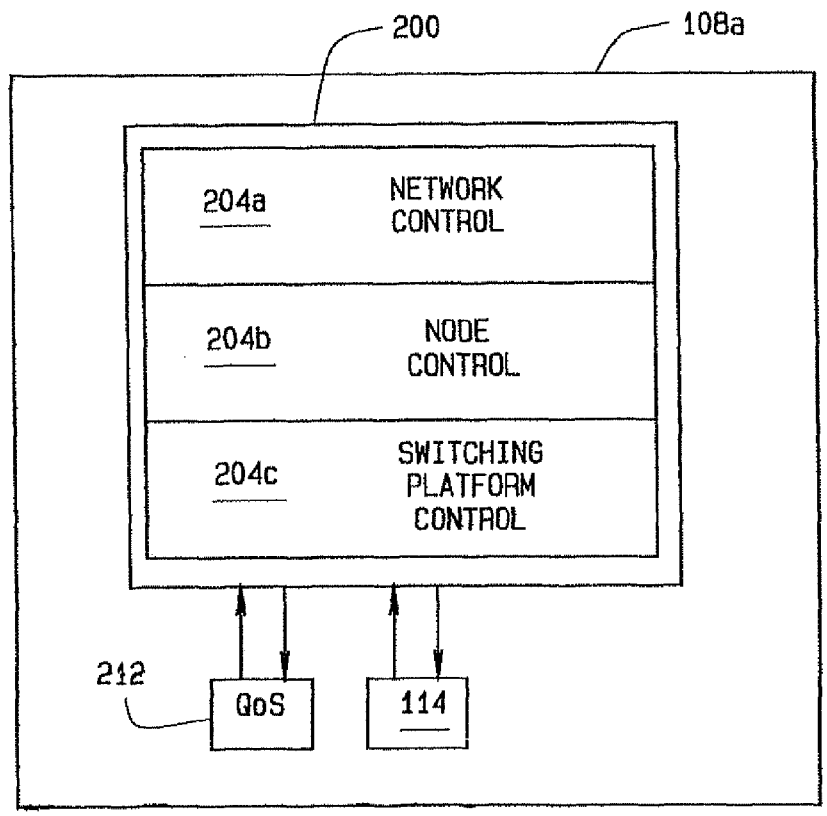
FIG. 3 is a block diagram of a node of a network in accordance with one configuration of the present disclosure.

The node 108a is shown in greater detail in FIG. 3 which is typical of each node. The node 108a includes a node/network controller 200 having a plurality of control modules 204 which may be hierarchically organized. The node 108a includes an optional quality of service (QoS) module 212. The module 212 may be, for example, a differential service (DiffServ) component associated with the network layer 40 of the protocol stack 20 that classifies incoming packets with respect to QoS provisioning. It also is contemplated that other or additional modules for provisioning QoS, for example, provisioning based on an Integrated Services (IntServ) model, could be used in the network 100. Configurations also are contemplated, however, in which one or more nodes 108 may not include a QoS module 212.

The transmit scheduler 114 (also referred to as transmission scheduler) communicates with the node/network controller 200 as further described below. The transmit scheduler 114 manages a plurality of output queues (not shown) in which it schedules packets for transmission from the node 108a. Where an incoming packet includes a QoS classification, for example, as contained in the packet header, the transmit scheduler 114 may select an appropriate output queue based on the QoS classification.

In the present configuration, the node/network controller 200 includes three modules 204. A network control module 204a is configured to determine packet routing across the network 100 as further described below. A node control module 204b controls packet routing within the node 108a and communicates with the network control module 204a. A switching platform control module 204c controls switching of data packets to and from the node 108a and communicates with the node control module 204b. The switching platform control module 204c provides state information via the node and network control modules 204b and 204a to each of the other nodes 108 in the network 100. The state information pertains, for example, to an outbound link of the node 108a, for example, the link 116 (shown in FIG. 2).

The term "hierarchically organized" refers to how control may be exercised in a "top-down" fashion by one module 204 relative to another module 204. More specifically and for example, the network control module 204a provides control and command information to the node control module 204b for performance by the module 204b. Additionally, the node control module 204b provides control and command information to the switching platform control module 204c for performance by the module 204c. "Hierarchically organized" may also refer to how information may be passed in a "bottom-up" fashion by one module 204 to another module 204. For example, in the present configuration the switching platform control module 204c provides link state information to the node control module 204b, and the node control module 204b provides link state information to the network control module 204a.

The switching platform control module 204c manages various functions interfacing, e.g., with the physical layer 48 of the protocol stack 20. Specifically and for example, the switching platform control module 204c manages various functions associated with a very high speed packet switching platform. For an outgoing packet, the term "very high speed" may be used to describe, for example, the dedicated moving of contents from node memory to a specific output port of the node 108a. For an incoming packet, "very high speed" may describe the matching of the packet header against one or more hash tables generated by the node 108a.

The node control module 204b manages various node functions associated with the very high-speed switching platform and with terminals for establishing links, including, for example, free space optical (FSO) and/or radio frequency (RF) links, between the node 108a and other node(s) 108. The node control module 204b controls routing within the node 108a. Such routing can be hybrid (e.g., routing from a FSO terminal to a RF terminal of the node 108a) and may be based on such criteria as link state, packet destination and quality of service (QoS) requirements included in a packet header.

The network control module 204a can perform network system management with respect to the network 100. Specifically and for example, the module 204a may determine routing across the network 100 and may update such routing based, for example, on changes in node/link states, topology and/or atmospheric conditions. In one configuration, a centralized node 108 or other central site is used to perform network-level routing and distribute such routing, e.g., as one or more route tables, to node(s) 108. Additionally or alternatively, the control module 204a of each node 108 may independently compute a route table pertinent to that node 108. A route table thus determined at a network level may be passed to the node control module 204b, which passes the route table to the switching platform control module 204c.

Figure 4:
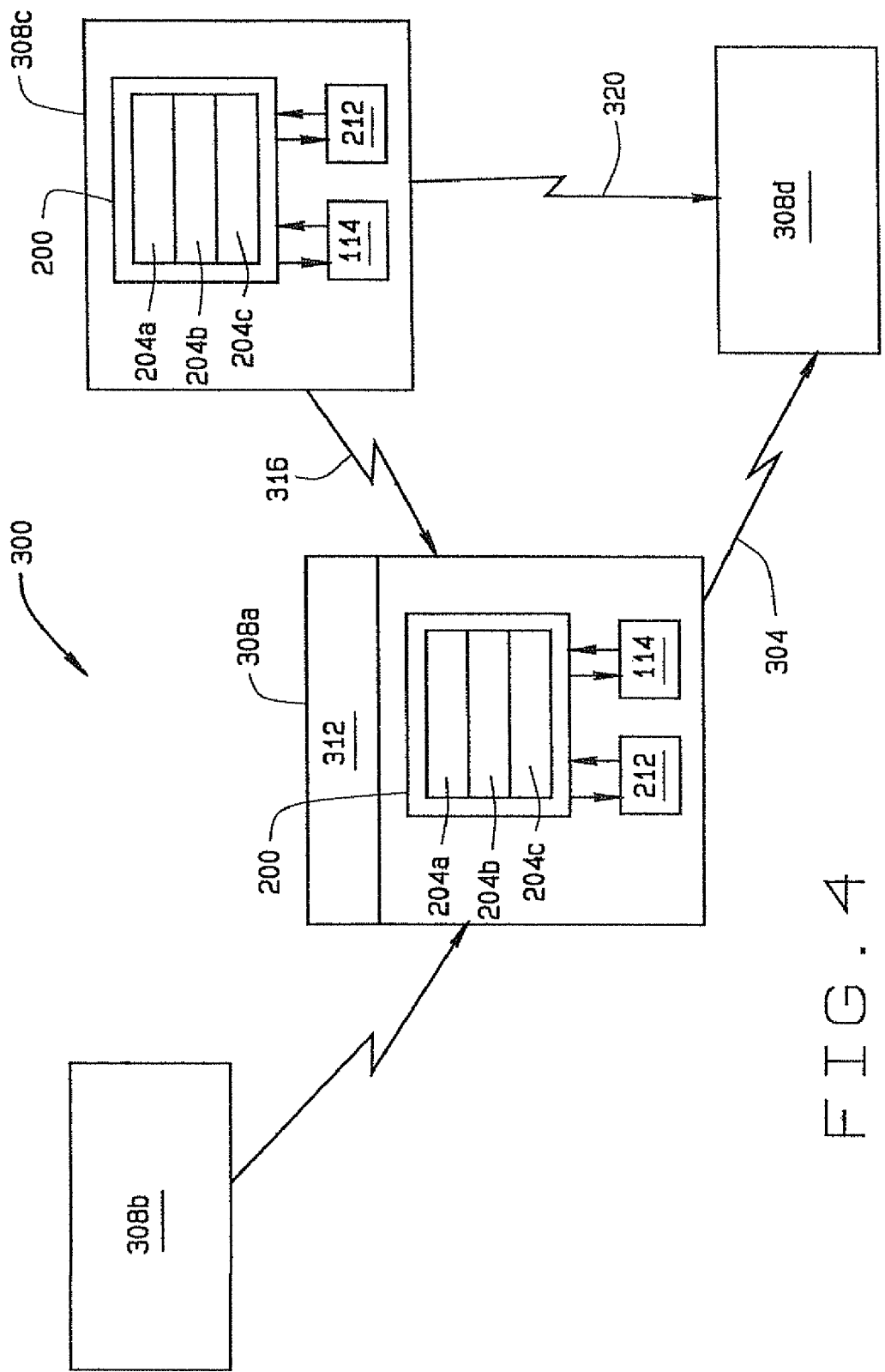
FIG. 4 is a block diagram of a network in accordance with one configuration of the present disclosure.

In one configuration, a network that supports quality of service (QoS) provisioning is indicated generally in FIG. 4 by reference number 300. The network 300 includes a plurality of nodes 308. Elements of the nodes 308 which are the same as or similar to elements shown in FIG. 3 are numbered the same as elements shown in FIG. 3.

Offered traffic on an outbound link 304 of a node 308a may include traffic that is arriving into the node 308a from peer node(s) 308b and 308c destined for the particular outbound link 304. Offered traffic on the link 304 also may include traffic originating from upper layer(s) 312 of the node 308a (e.g., from application(s) associated with the application layer 24 as discussed with reference to FIG. 1). Bandwidth capacity that is available for traffic originating from the upper layer(s) 312 of the node 308a and leaving via the link 304 can be measured, for example, as the difference between bandwidth capacity of the outbound link 304 and the traffic that is arriving into the node 308a from peer node(s) 308b and 308c destined for the particular outbound link 304.

Bandwidth capacity of the outbound link 304, e.g., where the link 304 is a FSO or RF link, could vary, for example, according to atmospheric and/or topology conditions. Accordingly, the node/network controller 200 of the node 308a may switch a transmission rate of the link 304 based on a state of the outbound link 304, for example, on signal-to-noise ratio (SNR) characteristics of the outbound link 304, e.g., to ensure that data communication is performed via the link 304 at a desired bit error rate (BER). Additionally or alternatively, under sufficiently adverse atmospheric conditions, transmission via the link 304 could be stopped, for example, pending improved conditions.

The state of the outbound link 304 is communicated by the switching platform control module 204c of the node 308a, as previously described with reference to FIG. 3, to node and network control modules 204b and 204a of the node 308a and across the network 300. Thus the node 308c receives information pertaining to a link outbound from the node 308a. The state of the outbound link 304 may be communicated via control modules 204a, 204b and 204c of the node 308c to the transmit scheduler 114 of the node 308c. The transmit scheduler 114 of the node 308c may take the foregoing dynamic outbound link characteristics into account when scheduling a transmission, for example, over a link 316 outbound from the node 308c to the node 308a. Such scheduling may be based on transmission criteria derived by the network control module 204a of the node 308c. Thus, for example, if a node/link state of the node 308a changes during adverse atmospheric conditions, the node 308c may pair with the node 308d to form a link 320 and may schedule a transmission over the link 320 that previously might have been scheduled via links 316 and 304.

In one configuration, a link state of the outbound link 304 is used to update the QoS-provisioning component 212 of one of or both nodes 308a and 308c, to influence QoS provisioning in the network 300. In one implementation, a time-averaged history of bandwidths and instantaneous changes relating to the outbound link 304 may be used to prompt the network control module 204a, for example, of the node 308c to determine whether node interconnectivity and/or network routing needs to be updated as previously described with reference to FIGS. 2 and 3.

From the foregoing description, it can be understood that one implementation of a method of managing a network having a plurality of nodes can be described as follows. One of the nodes communicates a state of an outbound link to others of the nodes, and one or more of the other nodes schedules a transmission based on the communicated state. The foregoing method allows a transmission to be rescheduled "on the fly" in the event, for example, of inclement weather conditions and/or changing network usage. A node transmit scheduler 114 thus can use information available at a network control level, relating to transmission conditions at another node, to schedule a transmission. Additionally or alternatively, in configurations in which QoS provisioning is supported using DiffServ or other provisioning capability, such provisioning can be updated based on such information.

Implementations of the foregoing management apparatus and methods can provide "good enough" solutions for routing and resource management that can be determined rapidly. A network in which such an approach is implemented can adapt to changing resource conditions, while an acceptable level of overall network utilization efficiency is maintained. The foregoing apparatus and methods allow a node using highly directional point-to-point links such as FSO and/or RF links to create or join an ad hoc infrastructure, for example, within a dynamic ad hoc mobile heterogeneous network environment. The foregoing control modules allow for a scalable and modular design that can be used across similar communication systems. The above described apparatus and methods provide a scalable approach to managing and controlling a network system, and each network node, within a dynamic ad hoc mobile heterogeneous network environment.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of managing a plurality of nodes, the method comprising:

each node maintaining a pairing list of discovered nodes, if any, discovered by the maintaining node and with which the maintaining node may potentially pair, the pairing list maintained based on pairing criteria applicable by the maintaining node to nodes not paired with the maintaining node;

at least a first of the nodes announcing its presence to discover nodes with which to potentially pair;

at least a second of the nodes, in response to the announcing, sending its node/link state to at least the first node;

based on whether the node/link state sent by the second node is in accordance with the pairing criteria of the first node, the first node selectively listing the second node in the pairing list of the first node;

based on whether the second node is listed in the pairing list of the first node, the first node selectively pairing with the second node and establishing connectivity with the second node via one or more links between the first and second nodes;

at least the maintaining and selectively pairing performed reiteratively, during operation of a network that includes at least one of the first and second nodes, as part of a background process in which each of the nodes of the network (a) receives current node/link states of all other nodes in the network and (b) manages a link topology relative to the network based on the pairing list of the node and on the current node/link states;

the first node capable of communicating with the second node over a link outbound from the first node to the second node via a first transport medium and inbound to the first node from the second node via a transport medium different from the first transport medium.

2. The method of claim 1, wherein the first and second transport media include free-space optical (FSO) and radiofrequency (RF).

3. The method of claim 1, wherein a third node of the network updates a routing table in accordance with the link topology maintained by the third node.

4. The method of claim 1, further comprising a node of the network using an order wire channel to communicate with a node not linked into the network.

5. The method of claim 1, further comprising the first and second nodes pairing and linking based on at least one node/link state criterion of the first node not met by a node from which an outbound link is outbound to the first node.

6. The method of claim 1, further comprising a node control module of the first node controlling hybrid routing within the first node based on a node/link state communicated from a third node.

7. A method of structuring an ad hoc network, the method comprising:

each of a plurality of nodes maintaining a pairing list of potential nodes, if any, with which to pair, the pairing list based on pairing criteria of the node maintaining the pairing list, the pairing criteria including a node/link state of a potential node with which to pair, the node/link state including a location and trajectory of the potential node;

a first of the nodes announcing its presence to discover nodes with which to potentially pair;

a second of the nodes, in response to the announcing, sending its node/link state to at least the first node;

based on whether the node/link state sent by the second node meets the pairing criteria of the first node, the first node selectively listing the second node in the pairing list of the first node;

based on whether the second node is listed in the pairing list of the first node, the first node pairing with the second node and the first and second nodes establishing one or more links between the first and second nodes such that the first node is capable of communicating with the second node over a link outbound from the first node to the second node via a first transport medium and inbound to the first node from the second node via a transport medium different from the first transport medium;

at least the maintaining and pairing performed reiteratively as part of a background process during operation of the ad hoc network;

the background process comprising:

each node of the network receiving updates of node/link states of each of the other nodes of the network and each node of the network using the updates to maintain a link topology that includes all nodes of the network; and based on one of the updates, a third node selectively pairing with a fourth node listed in the pairing list of the third node to establish connectivity with the fourth node.

8. The method of claim 7 wherein the third node pairs with the fourth node based on a changed node/link state of a fifth node.

9. The method of claim 7, wherein the pairing is performed via an order wire channel outside the network.

10. The method of claim 7, wherein a node/link state comprises a number of links, a current pairing state, a link bandwidth, and a link utilization.

11. The method of claim 7, wherein the different transport media include radiofrequency (RF) and free-space optical (FSO).

12. A network comprising:

a plurality of nodes, each node configured to control routing of packets through the node based on a network link topology including each of the nodes, the link topology maintained on each node using node/link state information received by the node reiteratively in a background process (a) from one or more nodes outside the network sending their node/link states in response to announcing nodes for possible selection by one of the announcing nodes for inclusion, based on pairing criteria of the one of the announcing nodes, in a pairing list maintained by the one of the announcing nodes for possible establishment of links that add one or more nodes to the network, and (b) from nodes of the network multicasting updates of their node/link states to the other nodes of the network;

each node including:
- a network control module configured to use the network link topology maintained by the node to determine one or more route tables for network-level routing;
- a node control module that receives the one or more route tables from the network control module and uses the one or more route tables to control packet routing within the node between terminals of the node; and
- a switching platform control module that, based on the one or more route tables, controls switching of packets to and from the node and provides the node/link state information pertaining to the node to each of the other nodes via the node control module and network control module; a first of the nodes capable of communicating with a second node over a link outbound from the first node to the second node via a first transport medium and inbound to the first node from the second node via a transport medium different from the first transport medium.

13. The network of claim 12 wherein a network control module of one of the nodes determines packet routing based on state information pertaining to an outbound link of another node.

14. The network of claim 12 wherein a network control module of one of the nodes determines packet routing over a link topology changed based on at least one of a change in a node/link state, a node location, a node trajectory, and an atmospheric condition.

15. The network of claim 12 wherein the terminals of one of the nodes include hybrid terminals for different transport media, and the node control module of the one of the nodes controls packet routing between the hybrid terminals.

16. The network of claim 15 wherein the node control module of the one of the nodes controls the packet routing between the hybrid terminals based on at least one of a link state, a packet destination and a quality of service (QoS) requirement.

17. The network of claim 12 wherein a network control module of one of the nodes passes a route table, via the node control module of the node, to the switching platform control module of the node.

18. The network of claim 12 wherein one of the nodes comprises QoS module for specifying quality of service (QoS), and wherein the network control module of the one of the nodes updates the QoS module when a node/link state of another node changes.

19. The network of claim 12 wherein the network control module updates interconnectivity of the nodes and updates a network route table.

20. The network of claim 19 wherein the network control module performs the updating based on a history of outbound link bandwidth.

21. The network of claim 12 wherein the switching platform control module switches a link transmission rate based on at least one of a signal-to-noise ratio (SNR) characteristic and a bit error rate (BER) of the link.

22. A non-transitory machine-readable medium for use with a processor having a memory, the machine-readable medium comprising:
- instructions executable by a processor to configure a first node to maintain, in accordance with pairing criteria of the first node, a pairing list of potential pairing nodes;
- instructions executable by a processor to configure the first node to (a) announce, reiteratively in a background process, the presence of the first node, (b) to evaluate, relative to the pairing criteria of the first node, node/link state information received from other nodes in response to the announcing by the first node, and (c) to selectively list one or more of the other nodes on the pairing list of the first node;
- instructions executable by a processor to configure the first node to select one or more nodes in the pairing list for pairing with the first node to form links in a network;
- instructions executable by a processor to configure a network control module of the first node to determine one or more route tables for packet routing across the network based on a link topology of the network maintained on and including each node of the network, the link topology maintained using node/link state information received by the nodes reiteratively in the background process from (a) one or more nodes outside the network sending their node/link states in response to announcing nodes for potential pairing with the announcing nodes and/or (b) paired nodes sending multicast updates of their node/link states;
- instructions executable by a processor to configure a node control module of the first node to receive and use the one or more route tables from the network control module to control packet routing within the first node between terminals of the first node; and
- instructions executable by a processor to configure a switching platform control module of the first node to:
  - control switching of packets to and from the first node; and
  - provide node/link state information pertaining to an outbound link of the first node via the node control module and the network control module to another node of the network;
- where to form a link includes to form a link outbound from the first node to a second node via a first transport medium and inbound to the first node from the second node via a transport medium different from the first transport medium.

23. A node-performed method of controlling communication among nodes, the method comprising:
- at least some nodes announcing their presence to discover nodes with which they might potentially pair;
- at least some nodes, in response to the announcing, sending their node/link states to one or more of the announcing nodes;
- based on the sent node/link states, at least one of the announcing nodes selectively listing one or more of the sending nodes on a pairing list of potential nodes with which to pair;
- at least one node pairing with one or more nodes on the pairing list of the pairing node to establish connectivity between paired nodes;
- the announcing, sending, and pairing performed reiteratively as part of a background process during operation of the network wherein each paired node is provided with background updates of node/link states of each of the other paired nodes; and
- a first node communicating with a second node paired with the first node, the communicating performed over a link outbound from the first node to the second node via a first transport medium and inbound to the first node from the second node via a second transport medium different from the first transport medium.

24. The method of claim 23, further comprising the second node, in response to an altered transmission rate of the first link, pairing with a fourth node on the pairing list of the second node.

25. The method of claim 23, wherein the first and second transport media include free-space optical (FSO) and radiofrequency (RF).

26. The method of claim 23, further comprising the first node transmitting via the link at a bit error rate based on a signal-to-noise characteristic of an outbound link from a third node.

27. The method of claim 24, wherein altering a transmission rate comprises stopping transmission.

* * * * *